US008654706B2

(12) United States Patent
Shaw et al.

(10) Patent No.: US 8,654,706 B2
(45) Date of Patent: Feb. 18, 2014

(54) SYSTEMS, METHODS AND COMPUTER PROGRAM PRODUCTS FOR INTELLIGENT APN MANAGEMENT IN WIRELESS COMMUNICATIONS NETWORKS

(75) Inventors: Venson Shaw, Kirkland, WA (US); Gholam-Reza Rahsaz, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 444 days.

(21) Appl. No.: 12/758,005

(22) Filed: Apr. 11, 2010

(65) Prior Publication Data

US 2011/0249618 A1    Oct. 13, 2011

(51) Int. Cl.
  *H04L 1/00*  (2006.01)
(52) U.S. Cl.
  USPC ........................... 370/328; 370/352; 455/411
(58) Field of Classification Search
  USPC ................. 370/252–253, 328–338, 401–427, 370/352–356; 455/436, 411
  See application file for complete search history.

(56) References Cited

U.S. PATENT DOCUMENTS

| 7,212,810 | B2* | 5/2007 | Babbar et al. | 455/414.1 |
| 2005/0233740 | A1* | 10/2005 | Jiang | 455/432.1 |
| 2006/0258356 | A1* | 11/2006 | Maxwell et al. | 455/436 |
| 2008/0095129 | A1* | 4/2008 | Iyer | 370/338 |

* cited by examiner

*Primary Examiner* — Ricky Ngo
*Assistant Examiner* — Iqbal Zaidi
(74) *Attorney, Agent, or Firm* — Parks IP Law LLC; Jennifer P. Medlin, Esq.

(57) ABSTRACT

Systems, methods, and computer program products are for managing APNs in a wireless communications network during a PDP context activation sequence. An exemplary method includes a radio network controller (RNC) generating an APN assignment request in response to a PDP context activation request being received from a device and sending the APN assignment request to an intelligent APN management system (iAPNMS). The method also includes determining, at the iAPNMS based upon an assignment factor, an APN to assign to the PDP context activation request and assigning the APN to the PDP context activation request. The method also includes one of the RNC and the iAPNMS modifying the PDP context activation request to include the APN, and the RNC forwarding the PDP context activation request including the APN to a serving general packet radio service (GPRS) gateway support node (SGSN) to continue the PDP context activation sequence.

8 Claims, 5 Drawing Sheets

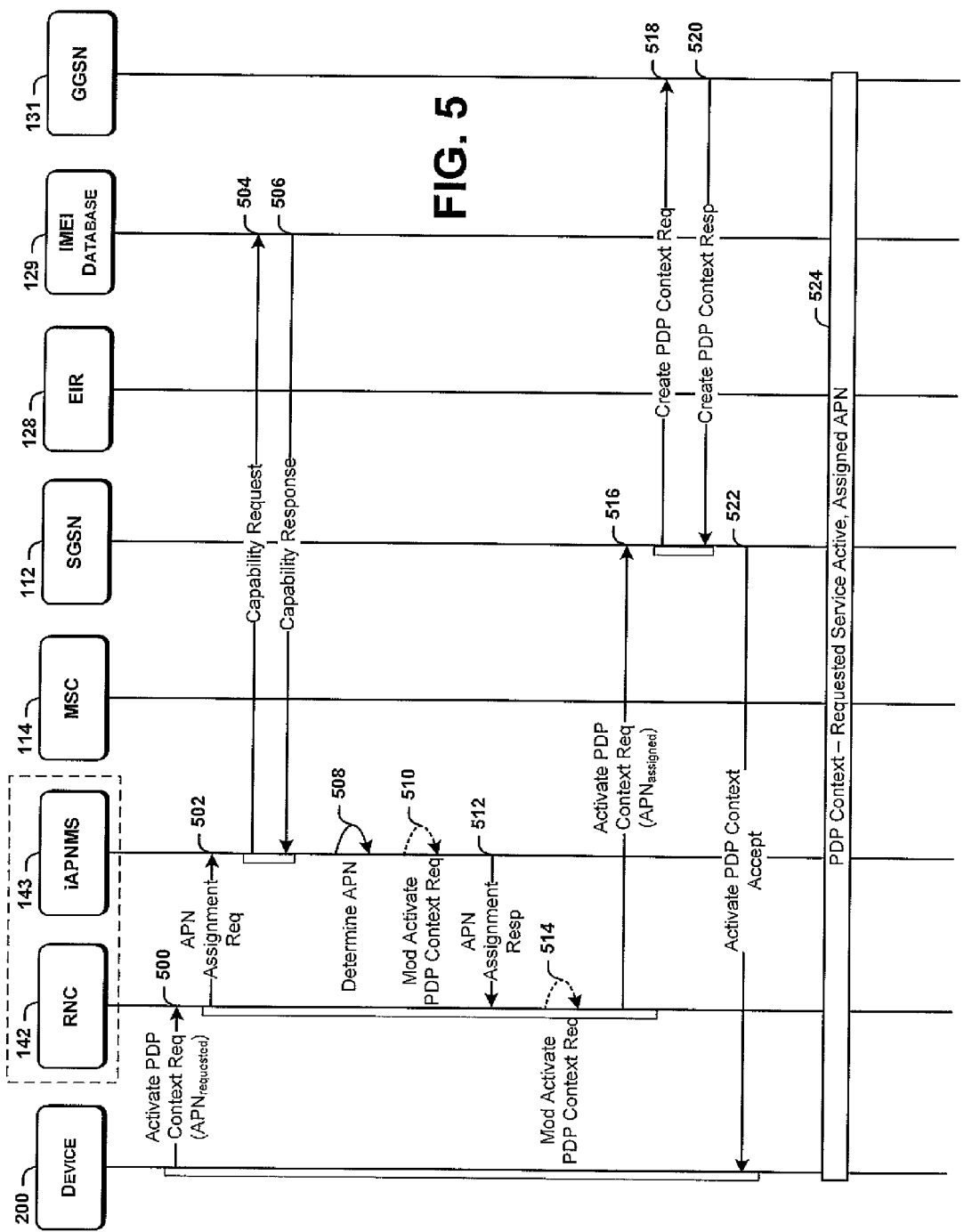

SYSTEMS, METHODS AND COMPUTER PROGRAM PRODUCTS FOR INTELLIGENT APN MANAGEMENT IN WIRELESS COMMUNICATIONS NETWORKS

TECHNICAL FIELD

The present disclosure relates generally to data communications networks and, more particularly, to systems, methods and computer program products for intelligent access point name (APN) management in wireless communications networks.

BACKGROUND

A packet data protocol (PDP) context provides a packet data connection over which a mobile device and a data network can exchange Internet protocol (IP) packets. A PDP context has a record of parameters that consists of all the required information for establishing an end-to-end connection with the data network. These parameters include a PDP type, a PDP address type, a quality of service (QoS) profile request (e.g., QoS parameters requested by a user), a QoS profile negotiated by the data network, an authentication type, and a domain name system (DNS) type (e.g., dynamic DNS or static DNS).

The PDP context is mainly designed to provide two specific functions for the mobile device. The PDP context is designed to allocate a PDP address, such as an IP version 4 or an IP version 6 type address, to the mobile device. The PDP context is also used to make a logical connection with QoS profiles, the set of QoS attributes negotiated for and utilized by a single PDP context, through the data network.

Current, high-end mobile devices are capable of establishing multiple PDP contexts to serve applications operating in parallel. These PDP contexts can differ in their QoS parameters and/or the target data network to which they provide a data connection. By way of example, a mobile device can establish a first PDP context to access the Internet through a web browser and a second PDP context to access an application provided by an application server.

Generally speaking, there are two types of PDP contexts—a primary PDP context and a secondary PDP context. A primary PDP context has a unique associated IP address. Primary PDP contexts can be activated or deactivated independently from one another. A secondary PDP context is created based upon a primary PDP context, and shares an IP address and access point (AP) with the primary PDP context on which it is based. Thus, the primary and the associated secondary PDP context provide connection to the same packet data network with different guaranteed QoS.

One primary PDP context might have multiple secondary contexts associated with it. Each PDP context has its own radio access bearer (RAB) and tunnel to transfer user plane data. The primary PDP context has to be active prior to activating an associated secondary PDP context. Any secondary PDP context can be deactivated while keeping the associated primary PDP context and any eventual other secondary PDP contexts active. If a primary PDP context is deactivated, this will also deactivate all of the associated secondary PDP contexts. In 3GPP (3$^{rd}$ Generation Partnership Project) networks, a total of eleven PDP contexts, including any combination of primary and secondary PDP contexts, may coexist simultaneously in connection with a single mobile device, although certain limitations of the mobile device may limit the number of PDP contexts the mobile device may maintain simultaneously.

Each of multiple PDP contexts can have different QoS profiles. A primary PDP context is a normal PDP context with default QoS profile attributes and it is always activated first. For the multiple primary PDP contexts, each context has a different PDP address and is used to attach to a different packet data network (PDN) identified by a different access point name (APN).

An APN is used in 3GPP data access networks (e.g., General Packet Radio Service (GPRS) or Evolved Packet Core (EPC) networks) to identify a PDN with which a mobile device communicates, and to define a type of service provided by the PDN. For example, an APN may identify a connection to an IP Multimedia Subsystem (IMS), a messaging service center (e.g., a Multimedia Messaging Service Center (MMSC)), a wireless application protocol (WAP) server, the Internet, an application server, or another device, node, network, or service.

In a PDN, an operator's packet domain network is responsible for providing data connectivity to the mobile user. The user accesses one or more PDNs provided by the operator or an external network provided by another operator. Exemplary PDNs include, but are not limited to, networks providing IMS services, MMS services, WAP services, Internet services, and visual voicemail (WM) services, A Gateway GPRS Support Node (GGSN) provides connectivity between one or more PDNs and the operator's packet domain network. In general, a user accesses a PDN via a GGSN, which may be located in a visited operator's network, or may be located in the user's home operator network. In some circumstances, inter-operator networks provide IP connectivity between operators' packet domain networks.

An APN is also used to identify the PDN from which to provide the user's IP address and to select a GGSN from which the PDN is accessible. APN resolution is the process of DNS look-up to determine the IP address of the GGSN that provides connectivity to the PDN identified by the APN. When a GPRS mobile device activates a PDP context, the mobile device provides the APN to which the mobile device wants to connect. The APN is resolved to identify and to select the appropriate GGSN, and to provide an IP address to the mobile device. The AP identified by the APN is then used in a DNS query to a private DNS network. This process gives the IP address of the GGSN which should serve the access point. At this point the PDP context can be activated.

APNs can be either shared or dedicated. Shared APNs allow a mobile device to share the PDP context with other applications. Shared APNs compromise performance for service availability. On the other hand, dedicated APNs use a dedicated PDP context without sharing with other applications to meet high performance requirements of some applications (e.g., real-time applications such as visual voicemail).

SUMMARY

The innovative systems, methods, and computer program products described herein are for managing APNs in a wireless communications network during a PDP context activation sequence.

According to one aspect of the present disclosure, a method includes a radio network controller (RNC) generating an APN assignment request in response to a PDP context activation request being received from a device and sending the APN assignment request to an intelligent APN management system (iAPNMS). The method also includes determining, at the iAPNMS based upon an assignment factor, an APN to assign to the PDP context activation request and assigning the APN to the PDP context activation request. The method also includes one of the RNC and the iAPNMS modifying the PDP context activation request to include the APN, and the RNC forwarding the PDP context activation request including the APN to a serving general packet radio service (GPRS) gateway support node (SGSN) to continue the PDP context activation sequence.

In one embodiment, the RNC is a universal mobile telecommunications system (UMTS) RNC. In another embodiment, the RNC is a long term evolution (LTE) RNC. In another embodiment, the RNC is a global system for mobile communications (GSM) base station controller (BSC).

In one embodiment, the iAPNMS is part of the RNC. In another embodiment, the iAPNMS is external to and in communication with the RNC.

In one embodiment, determining the APN to assign to the PDP context activation request is based upon at least one of (I) a requested service identified by a service identification included in the PDP context activation request, (II) a device type of the device, (III) a capability of the device, (IV) a current network status, (V) a predicted, future network status, (VI) a network load, (VII) a network element node, (VIII) a number of devices currently connected to an APN requested in the PDP context activation request, (IX) a number of devices currently receiving a service requested in the PDP context activation request, and (X) a load balancing scheme.

In one embodiment, the method also includes generating a mobile subscriber integrated services digital network (MSISDN) number to international mobile equipment identity (IMEI) resolution request, sending the MSISDN number to IMEI resolution request to an equipment identity register (EIR) to resolve an IMEI associated with the device, receiving the IMEI associated with the device from the EIR, generating a capability request, sending the capability request to an IMEI database, receiving a capability of the device from the IMEI database, and determining the APN to assign to the PDP context activation request based upon the capability of the device.

In one embodiment, the method also includes generating an MSISDN number to IMEI resolution request, sending the MSISDN number to IMEI resolution request to an EIR to resolve an IMEI associated with the device and to obtain a capability of the device as identified by the IMEI, receiving the capability of the device from the EIR, and determining the APN to assign to the PDP context activation request based upon the capability of the device.

In one embodiment, the PDP context activation request includes an IMEI of the device and the APN assignment request is generated to include the IMEI. The method also includes generating a capability request, sending the capability request to an IMEI database to obtain a capability of the device as identified by the IMEI, receiving the capability of the device from the IMEI database, and determining the APN to assign to the PDP context activation request based upon the capability of the device.

In one embodiment, the PDP context activation request includes an IMEI of the device and the APN assignment request is generated to include the IMEI. The method also includes generating a capability request, sending the capability request to an EIR to obtain a capability of the device as identified by the IMEI, receiving the capability of the device from the EIR, and determining the APN to assign to the PDP context activation request based upon the capability of the device.

According to another aspect of the present disclosure, a computer program product includes instructions that, when executed by a processor, cause the processor perform the steps of the method described above for managing APNs in a wireless communications network during a PDP context activation sequence.

According to another aspect of the present disclosure, a system for managing APNs in a wireless communications network during a PDP context activation sequence includes an RNC and an iAPNMS. The RNC is configured to receive a PDP context activation request from a device, generate an APN assignment request, and send the APN assignment request to the iAPNMS. The iAPNMS is configured to receive the APN assignment request, determine, based upon an assignment factor, an APN to assign to the PDP context activation request, and assign the APN to the PDP context activation request. In one embodiment, the RNC is configured to modify the PDP context activation request to include the APN. In another embodiment, the iAPNMS is configured to modify the PDP context activation request to include the APN. In either embodiment, the RNC is configured to forward the PDP context activation request including the APN to a SGSN to continue the PDP context activation sequence.

In one embodiment, the RNC is an UMTS RNC. In another embodiment, the RNC is an LTE RNC. In another embodiment, the RNC is a GSM BSC.

In one embodiment, the iAPNMS is part of the RNC. In another embodiment, the iAPNMS is external to and in communication with the RNC.

In one embodiment, the iAPNMS is configured to determine the APN to assign to the PDP context activation request comprises the iAPNMS being configured to determine the APN to assign to the PDP context activation request based upon at least one of (I) a requested service identified by a service identification included in the PDP context activation request, (II) a device type of the device, (III) a capability of the device, (IV) a current network status, (V) a predicted, future network status, (VI) a network load, (VII) a network element node, (VIII) a number of devices currently connected to an APN requested in the PDP context activation request, (IX) a number of devices currently receiving a service requested in the PDP context activation request, and (X) a load balancing scheme.

In one embodiment, the iAPNMS is further configured to generate an MSISDN number to IMEI resolution request, send the MSISDN number to IMEI resolution request to an EIR to resolve an IMEI associated with the device, receive the IMEI associated with the device from the EIR, generate a capability request, send the capability request to an IMEI database, receive, in response to the capability request, a capability of the device from the IMEI database, and determine the APN to assign to the PDP context activation request based upon the capability of the device.

In one embodiment, the iAPNMS is further configured to generate an MSISDN number to IMEI resolution request, send the MSISDN number to IMEI resolution request to an EIR to resolve an IMEI associated with the device and to obtain a capability of the device as identified by the IMEI, receive, in response to the MSISDN number to IMEI resolution request, the capability of the device from the EIR, and determine the APN to assign to the PDP context activation request based upon the capability of the device.

In one embodiment, the PDP context activation request includes an IMEI of the device and the RNC is configured to generate the APN assignment request including the IMEI. The iAPNMS is further configured to generate a capability request, send the capability request to an IMEI database to obtain a capability of the device as identified by the IMEI, receive the capability of the device from the IMEI database, and determine the APN to assign to the PDP context activation request based upon the capability of the device.

In one embodiment, the PDP context activation request includes an IMEI of the device and the RNC is configured to generate the APN assignment request including the IMEI. The iAPNMS is further configured to generate a capability request, send the capability request to an EIR to obtain a capability of the device as identified by the IMEI, receive the capability of the device from the EIR, and determine the APN to assign to the PDP context activation request based upon the capability of the device.

BRIEF DESCRIPTION OF THE DRAWINGS

FIG. 5 schematically illustrates an exemplary message flow for intelligent management of APNs, according to yet another embodiment of the present disclosure.

DETAILED DESCRIPTION

Figure 1:
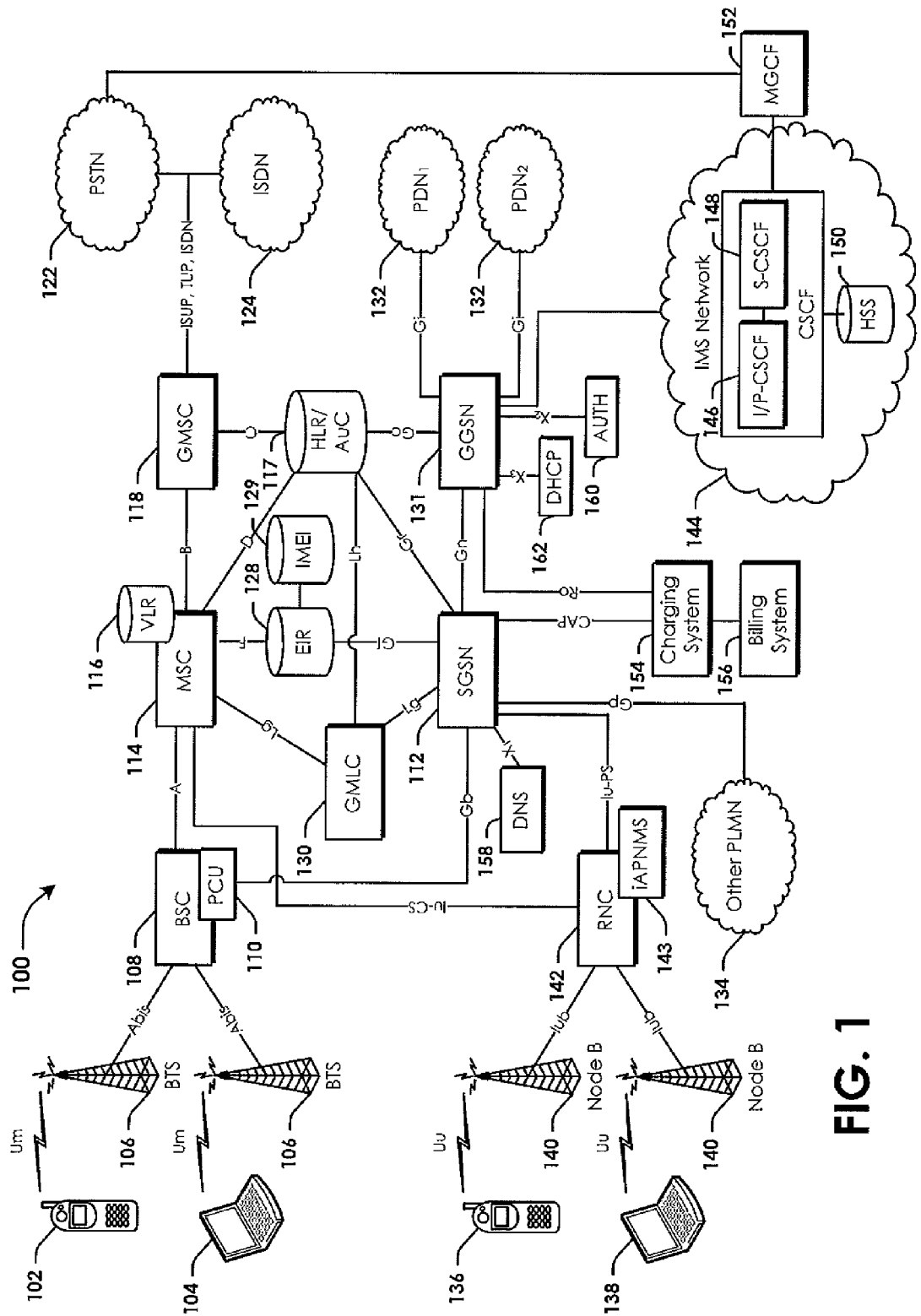
FIG. 1 schematically illustrates a communications network in which some embodiments of the present disclosure are implemented.

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards such as Global System for Mobile communications (GSM) and a Universal Mobile Telecommunications System (UMTS). It should be understood, however, that the systems and methods disclosed herein may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

While the message flows, processes and methods described herein may, at times, be described in a general context of computer-executable instructions, the message flows, processes and methods of the present disclosure can also be implemented in combination with other program modules and/or as a combination of hardware and software. The term "application," or variants thereof, is used expansively herein to include routines, program modules, programs, components, data structures, algorithms, service, and the like. Applications can be implemented on various system configurations including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

Referring now to the drawings in which like numerals represent like elements throughout the several views, FIG. 1 schematically illustrates an exemplary wireless communications network 100. The wireless communications network 100 includes two radio access networks (RANs). A first RAN, illustrated in the upper left hand portion of FIG. 1, is dedicated to GSM-based network access. A second RAN, illustrated in the lower left hand portion of FIG. 1, is dedicated to UMTS-based network access. The innovative aspects of the present disclosure may be implemented in alternative networks that use other access technologies such as those described above. The first RAN is now described.

The illustrated wireless communications network 100 includes a first mobile station (MS) 102 and a second MS 104 that are each in communication with a base transceiver station (BTS) 106 via the Um radio (air) interface. The BTSs 106 are terminating nodes for the radio interface in the illustrated first RAN. Each BTS 106 includes one or more transceivers and is responsible for ciphering of the radio interface.

In the illustrated embodiment, the first MS 102 is a mobile device and the second MS 104 is a computer such as a laptop with an integrated or external, removable GSM access card. Each MS 102,104 includes mobile equipment, such as, but not limited to, one or more of keyboards, screens, touch screens, multi-touch screens, radio transceivers, circuit boards, processors, memory, subscriber identity modules (SIM), universal SIMs (USIM), or universal integrated circuit card (UICC) that contains subscriber information to enable network access to the wireless communications network 100, and the like.

Each BTS 106 is in communication with a base station controller (BSC) 108 via an Abis interface. Typically, a BSC has tens or even hundreds of BTSs under its control. The BSC 108 is configured to allocate radio resources to the MSs 102, 104, administer frequencies, and control handovers between BTSs 106 (except in the case of an inter-Mobile Switching Center (MSC) handover in which case control is in part the responsibility of the MSC). One function of the BSC 108 is to act as a concentrator, so that many different low capacity connections to the BTS 106 become reduced to a smaller number of connections towards the MSC. Generally, this means that networks are often structured to have many BSCs 108 distributed into regions near the BTSs 106 and connected to large centralized MSC sites, Although illustrated as a distinct element, the functions provided by the BSC 108 may alternatively be incorporated in the BTS 106. The Abis interface is eliminated in such a configuration.

The BSC 108 is logically associated with a packet control unit (PCU) 110 when GPRS capabilities are employed. The PCU 110 is configured to support radio related aspects of GPRS when connected to a GSM network. The PCU 110 is in communication with a serving GPRS support node (SGSN) 112 via a Gb interface. The SGSN 112 records and tracks the location of each mobile device (e.g., MSs 102, 104) in the wireless communications network 100. The SGSN 112 also provides security functions and access control functions.

The BSC 108 is also in communication with an MSC 114 via an A interface. The MSC 114 is configured to function as a telecommunications switch. The MSC 114 is in communication with location databases such as a visiting location register (VLR) 116 and a home location register (HLR) 117. The VLR 116 may be logically associated with the MSC 114 as illustrated or may be provided as a separate network element in communication with the MSC 114. The VLR 116 is a database configured to store all subscriber data that is required for call processing and mobility management for mobile subscribers that are currently located in an area controlled by the VLR 116.

The HLR 117 is in communication with the MSC 114 and VLR 116 via the D interface. The HLR 117 is a database configured to provide routing information for mobile terminated calls and various messaging communications. The HLR 117 is also configured to maintain subscriber data that is distributed to the relevant VLR (e.g., the VLR 116) or the SGSN 112 through an attach process and to provide mobility management procedures, such as location area and routing area updates. The HLR 117 may be logically associated with an authentication center (AuC) as illustrated, or the AuC may be provided as a separate network element in communication with the HLR 117.

The AuC is configured to authenticate each UICC/SIM/USIM that attempts to connect to the wireless telecommunications network 100, for example, when a mobile device is powered on. Once authenticated, the HLR 117 is allowed to manage the UICC/SIM/USIM and services provided to the MS 102, 104. The AuC also is capable of generating an encryption key that is used to encrypt all wireless communications between the MS 102, 104 and the wireless communications network 100.

The MSC 114 is also in communication with a gateway MSC (GMSC) 118 via a B interface. The GMSC 118 is configured to provide an edge function within a public land mobile network (PLMN). The GMSC 118 terminates signaling and traffic from a public switched telephone network (PSTN) 122 and an integrated service digital network (ISDN) 124, and converts the signaling and traffic to protocols employed by the mobile network. The GMSC 118 is in communication with the HLR/AuC 117 via a C interface to obtain routing information for mobile terminated calls originating from fixed network devices such as, for example, landline telephones that are in communication with the mobile network via the PSTN 122.

The MSC 114 is also in communication with an equipment identity register (EIR) 128 via an F interface. The EIR 128 is a database that can be configured to identify subscriber devices that are permitted to access the wireless telecommunications network 100. An international mobile equipment identity (IMEI) is a unique identifier that is allocated to each mobile device and is used to identify subscriber devices in the EIR 128. The IMEI includes a type approval code, a final assembly code, a serial number, and a spare digit. The IMEI can also provide the hardware and software capabilities of a device. The systems and methods of the present disclosure, in one embodiment, use the IMEI to determine the capabilities of a device requesting a new PDP context to a particular APN and assign a new APN based upon the capabilities of the device. IMEI is typically placed in the EIR 128 once its operation has been certified for the infrastructure of the network 100 in a laboratory or validation facility. The EIR 128 may alternatively be in communication with an external IMEI database 129 to retrieve IMEI information. The IMEI database 129 may alternatively be configured as part of the EIR 128.

The SGSN 112 and the MSC 114 are also in communication with a gateway mobile location center (GMLC) 130 via an Lg interface. The GMLC 130 can communicate with the HLR/AUc 117 via an Lh interface to acquire routing information.

The EIR 128 and the HLR/AuC 117 are each in communication with the SGSN 112 via a Gf interface and a Gr interface, respectively. The SGSN 112, in turn, is in communication with a gateway GPRS support node (GGSN) 131 via a Gn interface. The GGSN 131 is configured to provide an edge routing function within a GPRS network to external packet data networks (PDNs) 132, such as networks providing IP multimedia subsystem (IMS), multimedia messaging service (MMS), wireless application protocol (WAP) access, Internet access, and visual voicemail (VVM) services, for example.

The GGSN 131 is in communication with the PDNs 132 via a Gi interface. The GGSN 131 includes firewall and filtering functionality. The HLR/AuC 117 is in communication with the GGSN 131 via the Gc interface.

The SGSN 112 is also in communication with other PLMNs 134 via an external GGSN (not shown). The external GGSN provides access to the other PLMNs 134. The other PLMNs 134 may be, for example, a foreign network such as a wireless telecommunications network operated by another service provider or the same service provider as the illustrated network.

The second RAN, illustrated in the lower left hand portion of FIG. 1, is dedicated to UMTS-based network access and is now described. The illustrated wireless communications network 100 also includes a first user equipment (UE) 136 and a second UE 138 that are each in communication with a Node B 140 via a Uu radio (air) interface. The node B 140 is the terminating node for the radio interface in the second RAN. Each Node B 140 includes one or more transceivers for transmission and reception of data across the Uu radio interface. Each node B 140 is configured to apply codes to describe channels in a CDMA-based UMTS network. Generally, the node B 140 performs similar functions for the UMTS network (or similarly for an LTE network) that the BTS 106 performs for the GSM network.

In the illustrated embodiment, the first UE 136 is a mobile phone (e.g., the mobile device 102, 800) and the second UE 138 is a computer such as a laptop with an integrated or external, removable UMTS card. Each UE 136, 138 includes mobile equipment such as one or more of keyboards, screens, touch screens, multi-touch screens, radio transceivers, circuit boards, processors, memory, SIMs, USIMs, or UICCs that contains subscriber information to enable network access to the wireless communications network 100, and the like. Generally, the UEs 136, 138 perform similar functions in the UMTS network that the MSs 102, 104 perform in the GSM network.

Each node B 140 is in communication with a radio network controller (RNC) 142 via a Iub interface. The RNC 142 is configured to allocate radio resources to the UEs 136, 138, administer frequencies, and control handovers between node Bs 140 (and others not shown). Although illustrated as a distinct element, the RNC 142 functions may alternatively be located within the node Bs 140. In this configuration the Iub interface is eliminated. Generally, the RNC 142 performs similar functions for the UMTS network that the BSC 108 performs for the GSM network.

The RNC 142 is in communication with or, alternatively, includes an intelligent access point name management system (iAPNMS) 143. In one embodiment, the iAPNMS 143 is configured to determine an APN to assign to a requesting device based upon the requested service. In another embodiment, the iAPNMS 143 is configured to determine and assign an APN based upon the requesting device's type and/or the requesting device's capabilities. In another embodiment, the iAPNMS 143 is configured to determine and assign an APN based upon current or predicted (e.g., based upon historical data) network conditions. In some embodiments, the iAPNMS 143 determines and assigns APNs to effect a load balancing scheme. The aforementioned embodiments are captured, in part, in FIGS. 3-5 and the respective descriptions thereof.

The RNC 142 is in communication with the MSC 114 via an Iu-CS interface. The RNC 142 is also in communication with the SGSN 112 via an Iu-PS interface. The other network elements perform the same functions for the UMTS network as described above for the GSM network.

The communications network 100 also includes an IP multimedia subsystem (IMS) network 144. The IMS network 144 includes call state control functions (CSCFs) such as a proxy-CSCF (P-CSCF), an interrogating-CSCF (I-CSCF), and a serving-CSCF (S-CSCF). The P-CSCF is the first contact point in the IMS network 144 for a UE and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined I/P-CSCF 146 and the S-CSCF 148 is illustrated as a stand-alone element. Other CSCF configurations are contemplated.

The IMS network 144 also includes a home subscriber server (HSS) 150, which is a master user database that supports the IMS network 144 core network elements. The HSS 150 stores subscription-related information, such as subscriber account details and subscriber profiles, performs authentication and authorization of the user, and provides information about a subscriber's location and IP address. It is similar to the GSM HLR and AuC, described above as the combination HLR/AuC 117.

The IMS network 144 also includes a media gateway control function (MGCF) 152, which provides call control protocol conversions between the ISDN user part (ISUP) protocol used by the PSTN 122 and the session initiation protocol (SIP) used by the IMS network 144.

Referring back to the SGSN 112, it is shown that the SGSN 112 is in communication with a charging system 154 via a CAP interface. The GGSN 131 is also in communication with the charging system 154 via an Ro interface. The charging system 154, in turn, is in communication with a billing system 156.

Briefly, the charging system 154 is responsible for offline and online charging of subscriber accounts. The charging system 154 may be deployed to provide charging rule functions for prepaid and/or postpaid network platforms. The single charging system 154 is illustrated for simplicity; however, separate charging systems are contemplated and may be utilized if desired by the operating service provider.

The billing system 156 is responsible for billing postpaid customers and handling payments received for service provisioned for both postpaid and prepaid accounts in the network 100. Like the charging system 154, the billing system 156 may alternatively be designed as two separate entities for postpaid and prepaid applications.

The SGSN 112 is also in communication with a domain name system (DNS) server 158 via an exemplary $X_1$ interface. The SGSN 112, the DNS server 158 and the GGSN 131 communicate with one another during a PDP context activation sequence.

An exemplary PDP context activation sequence begins when a requesting mobile device (e.g., one of devices 102, 104, 136, 138) initiates the PDP context activation sequence to obtain the IP address for the device. The APN is specified by the requesting mobile device is passed as a parameter in an activate PDP context message. A service identification (service ID) is also included in the activate PDP context message. The service ID identifies the service the requesting mobile device is attempting to access. Upon receipt of the activate PDP context message, the SGSN 112 initiates a DNS query to the DNS server 158 to resolve an IP address for the GGSN (e.g., the GGSN 131) corresponding to the APN. The DNS server 158 provides the GGSN IP address to the SGSN 112, which uses the IP address to initiate a create PDP context request to the GGSN 131 corresponding to the APN.

The GGSN 131 is also in communication with an authentication server 160 via an exemplary $X_2$ interlace and a dynamic host configuration protocol (DHCP) server 162 via an exemplary $X_3$ interface. The GGSN 131 authenticates GPRS subscription information with the authentication server 160. The authentication server 160 operates using the RADIUS protocol or the DIAMETER protocol to authenticate subscription information prior to allowing a requesting mobile device to activate a PDP context. The authentication server 160 then notifies the GGSN 131 of the success/failure of the subscription authentication. Upon receiving notification of a successful authentication, the GGSN 131 communicates with the DHCP server 162 to retrieve a dynamic IP address for use in the PDP context.

Figure 2:
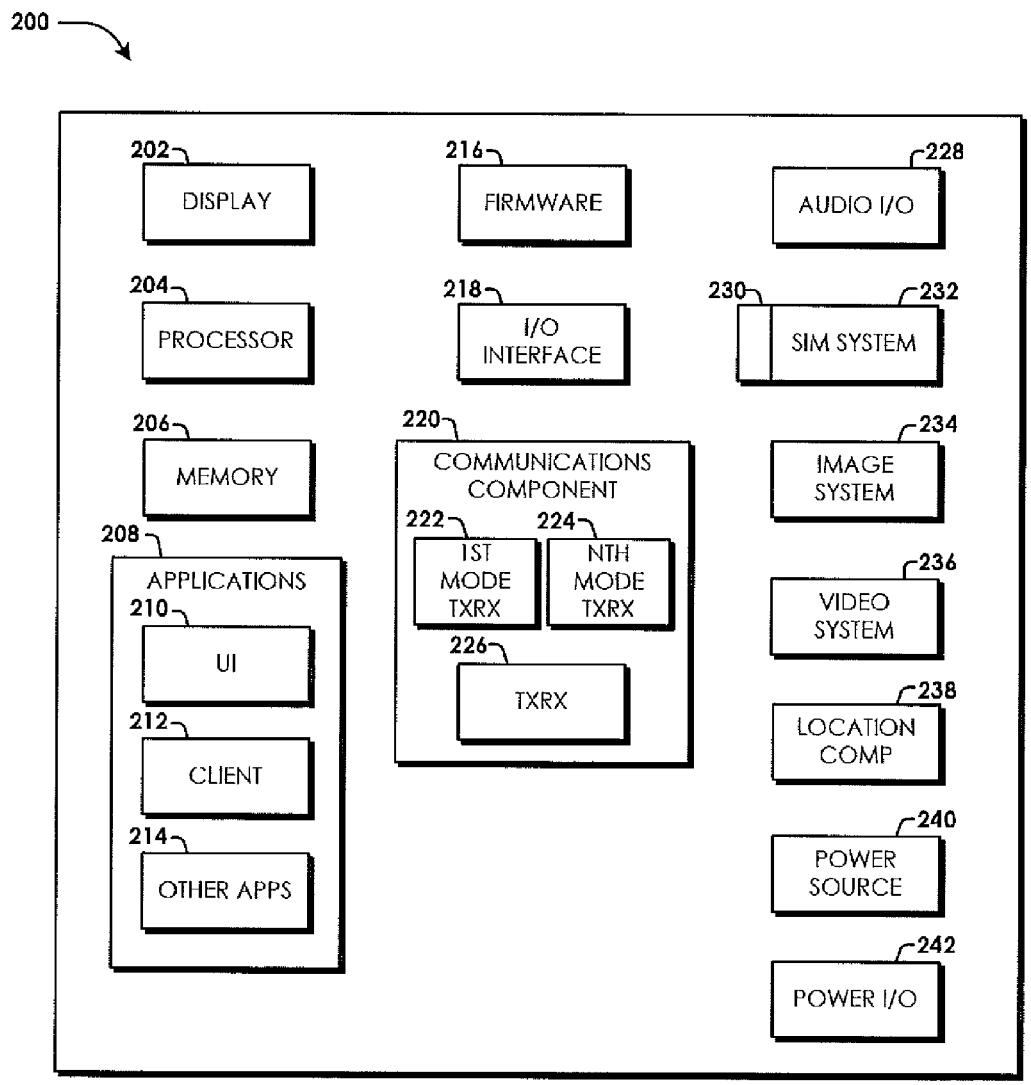
FIG. 2 schematically illustrates an exemplary mobile communications device and components thereof, according to some embodiments of the present disclosure.

Referring now to FIG. 2, a schematic block diagram of an exemplary mobile device 200 is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which the various aspects of some embodiments of the present disclosure can be implemented.

In some embodiments, the mobile devices 102, 104, 136, 138 illustrated in FIG. 1 are configured like the mobile device 200, now described in detail. In some embodiments, the mobile device 200 is a multimode headset and has a variety of computer-readable media, including, for example, volatile media, non-volatile media, removable media, and non-removable media. The term "computer-readable media" and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible medium that can be used to store the desired information and that can be accessed by the mobile device 200.

As illustrated in FIG. 2, the mobile device 200 includes a display 202 for displaying multimedia such as, for example, voicemail notification messages, application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The display 202 may display visual voicemail data in visual voicemail headers including, for example, date, time, message length, message status (i.e., new-unread, read, saved, or deleted), and calling line identity (CLI) information. The illustrated mobile device 200 also includes a processor 204 for processing data and/or executing computer-executable instructions of one or more applications 208, and a memory 206 for storing data and/or one or more of the applications.

In some embodiments, the application(s) 208 include a user interface (UI) application 210. The UI application 210 interfaces with a client 212 (e.g., an operating system (OS)) to facilitate user interaction with device functionality and data. In some embodiments, the client 212 is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 210 aids a user in entering message content, viewing received messages (e.g., multimedia messages, short messaging service (SMS) messages, visual voicemail messages), managing voicemails in a visual voicemail application, answering/initiating calls, entering/deleting data, entering and setting user IDs and passwords for device access, configuring settings, manipulating address book content and/or settings, multimode interaction, interacting with other applications 214, and the like. In some embodiments, the other applications 214 include, for example, visual voicemail applications, messaging applications (e.g., SMS, enhanced messaging service (EMS), multimedia messaging service (MMS) applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 206 and/or in a firmware 216, and are executed by the processor 204. The firmware 216 may also store code for execution during device power up or power down operations.

The illustrated mobile device 200 also includes an input/output (I/O) interface 218 for input/output of data, such as, for example, voicemail account information requests, visual voicemail management, location information, presence status information, user IDs, passwords, and application initiation (start-up) requests. In some embodiments, the I/O interface 218 is a hardwire connection, such as, for example, a USB, mini-USB, audio jack, PS2, IEEE 1394, serial, parallel, Ethernet (RJ48) port, RJ11 port, or the like. In some embodiments, the I/O interface 218 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 218 may be used for communications between the mobile device 200 and a network or local device, instead of, or in addition to, a communications component 220.

The communications component 220 interfaces with the processor 204 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, GSM, and an Nth cellular transceiver 224 operates in a different mode, such as UMTS. While only two cellular transceivers 222, 224 are illustrated, it should be appreciated that a plurality of transceivers can be included.

The illustrated communications component 220 also includes an alternative communications transceiver 226 for use by other communications technologies such as, for example, WIFI, WIMAX, BLUETOOTH, infrared, infrared data association (IRDA), near field communications (NFC), RF, and the like. In some embodiments, the communications component 220 also facilitates reception from terrestrial radio networks, digital satellite radio networks, Internet-based radio services networks, combinations thereof, and the like.

The communications component 220 processes data from a network such as, for example, the Internet, an intranet (e.g., business intranet), a home broadband network, a WIFI hotspot, and the like, via an ISP, DSL provider, or broadband provider. In some embodiments, the communications component 220 facilitates the transmission of authentication information from the mobile device 200 to a network for processing in accordance with the methods described herein.

Audio capabilities for the mobile device 200 can be provided by an audio I/O component 228 that includes a speaker for the output of audio signals and a microphone to collect audio signals.

The illustrated mobile device 200 also includes a slot interface 230 for accommodating a subscriber identity system 232 such as, for example, a SIM card, an USIM card, or an UICC including one or more SIM applications (e.g., ISIM, SIM, USIM, CSIM). Alternatively, the subscriber identity system 232 may be manufactured into the mobile device 200, thereby obviating the need for a slot interface 230. In some embodiments, the subscriber identity system 232 is programmed by a manufacturer, a retailer, a user, a computer, a network operator, or the like. The subscriber identity system 232 may be configured to store voicemail account information, contact information for the user and/or address book contacts, and/or other information.

The illustrated mobile device 200 also includes an image capture and processing system 234 (image system). Photos may be obtained via an associated image capture subsystem of the image system 234, for example, a camera. The illustrated mobile device 200 also includes a video system 236 for capturing, processing, recording, modifying, and/or transmitting video content. Photos and videos obtained using the image system 234 and the video system 236, respectively, may be added as message content to an MMS message and sent to another mobile device.

The illustrated mobile device 200 also includes a location component 238 for sending and/or receiving signals such as, for example, GPS data, assisted GPS (A-GPS) data, WIFI/WIMAX and/or cellular network triangulation data, combinations thereof, and the like, for determining a location of the mobile device 200. In some embodiments, the location component 238 interfaces with cellular network nodes, telephone lines, satellites, location transmitters and/or beacons, wireless network transmitters and receivers, for example, WIFI hotspots, radio transmitters, combinations thereof, and the like. Using the location component 238, the mobile device 200 obtains, generates, and/or receives data to identify its location, or transmits data used by other devices to determine the location of the mobile device 200.

The illustrated mobile device 200 also includes a power source 240, such as batteries and/or other power subsystem (AC or DC). The power source 240 can interface with an external power system or charging equipment via a power I/O component 242.

Figure 3:
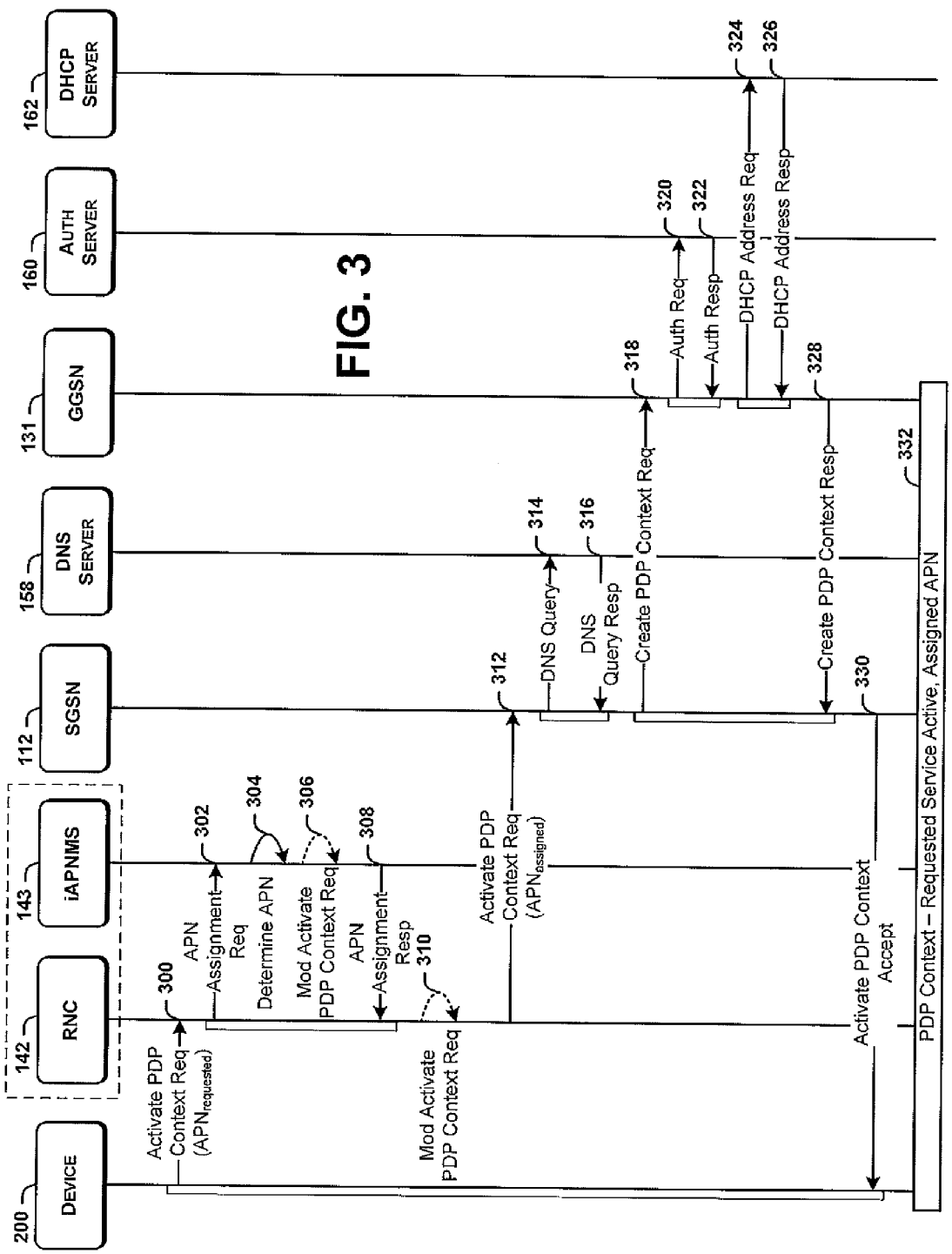
FIG. 3 schematically illustrates an exemplary message flow for intelligent management of APNs, according to an embodiment of the present disclosure.

Referring now to FIG. 3, an exemplary message flow for intelligent management of APNs according to an embodiment of the present disclosure is schematically illustrated. The message flow begins when a service (application) request is received (not shown) at the mobile device 200. This prompts the mobile device 200 to request a PDP context to be activated to access the requested service through a specified APN (e.g., an APN that is configured to serve the requested service). The request is formatted as an Activate PDP Context Request as is typical for a PDP context activation sequence.

At step 300, the Activate PDP Context Request is sent to the RNC 142 with the requested APN ($APN_{requested}$). At step 302, the RNC 142 generates and sends an APN Assignment Request to the iAPNMS 143. The iAPNMS 143, in one embodiment, is configured as a stand-alone network element that is in communication with the RNC 142 to receive the APN Assignment Request and perform the other steps described below with respect to communications between the RNC 142 and the iAPNMS 143. The iAPNMS 143, in another embodiment, is configured as part of the RNC 142. As such, all messages exchanged between the RNC 142 and the iAPNMS 143 are exchanged between a portion of the RNC 142 that provides typical RNC functionality as is known to those skilled in the art and a new portion dedicated to the novel functionality of the iAPNMS 143, as described in more detail herein.

At step 304, the iAPNMS 143 determines an APN to assign to the Activate PDP Context Request. This determination is made based upon one or more of (I) a requested service (e.g., as identified by the service ID passed in the Activate PDP Context Request), (II) a device type of the requesting device, (III) a capability of the requesting device, (IV) a current network status, (V) a predicted, future network status, (VI) a network load, (VII) a network element load (e.g., RNC load, SGSN load, etc.), (VIII) a number of devices currently connected to the requested APN, (IX) a number of devices currently receiving the requested service, and (X) a load balancing scheme.

The iAPNMS 143 may determine the APN to be assigned based upon information received from the device 200 in the Activate PDP Context Request. For example, the iAPNMS 143 may determine the APN based upon information (e.g., service ID) received from the device 200 in the Activate PDP Context Request when the requested service is identified in the Activate PDP Context Request, but the requested APN is unavailable due to network load conditions or the requested APN was incorrectly assigned by the device 200 due to out-of-date APN information at the device 200. In either of these cases, the iAPNMS 143 assigns a different APN that is available to serve the requested service. The iAPNMS 143 may, however, determine that the requested APN is suitable and instead report back to the RNC 142 that a new APN assignment will not be assigned.

In addition, or in the alternative, the iAPNMS 143 may determine the APN to be assigned based upon various network load factors including current factors and/or future, predicted factors (e.g., based upon historical data) recorded by any number of network elements including, for example, the RNC 142, the MSC 114, the SGSN 112, the GGSN 131, other network elements, and/or load factors received from one or more of the PDNs 132. The iAPNMS 143 may use load factor data to effect a load balancing scheme such that incoming service requests are dynamically assigned to be served by either a dedicated APN or a shared APN according to current or future loads of the various network elements involved in the execution of a particular service request. By way of example, a load balancing scheme may instruct the iAPNMS 143 to alternate assignments of shared and dedicated APNs to balance usage of network resources and available PDP contexts.

It is contemplated that the iAPNMS 143 may consider secondary factors when implementing a load balancing scheme or when assigning an APN based upon various network load factors. For example, the iAPNMS 143 may consider the device's 200 assigned quality of service (QoS) when determining whether to allow connection to the requested APN, assign a different APN, or downgrade from a dedicated APN to a shared APN.

For the case in which the iAPNMS 143 determines that a different APN should be assigned, at step 306 the iAPNMS 143 modifies the Activate PDP Context Request by replacing the requested APN with the APN determined by the iAPNMS 143 at step 304. The iAPNMS 143 then responds to the RNC 142, at step 308, with an APN Assignment Response including the modified Activate PDP Context Request. Alternatively, step 306 is omitted and the APN Assignment Response includes the assigned APN to replace the requested APN. Accordingly, at step 310, the RNC 142 modifies the Activate PDP Context Request by replacing the requested APN with the APN determined by the iAPNMS 143 at step 304 and sent to the RNC 142 at step 308.

Steps 306, 310 are illustrated as optional steps. In one embodiment, the steps 306, 310 are optional in relation to one another. In another embodiment, the steps 306, 310 are not used for the case in which the iAPNMS 143 determines, at step 304, that the requested APN is the appropriate APN for a given scenario and, as such, no modification to the Activate PDP Context Request is required as determined by the iAPNMS 143. It should be noted that the remaining description of FIG. 3 considers the case in which the iAPNMS 143 has determined that a new APN should be assigned.

At step 312, the RNC 142 sends the modified Activate PDP Context Request including the assigned APN to the SGSN 112. At step 314, the SGSN 112 initiates a DNS query to the DNS server 158 to find the GGSN (e.g., the illustrated GGSN 131 or another GGSN) corresponding to the APN specified by the device 200 in the modified Activate PDP Context Request. At step 316, the DNS server 158 provides the IP address for the serving GGSN (illustrated as the GGSN 131) to the SGSN 112. At step 318, the SGSN 112 sends a Create PDP Context Request to the GGSN 131 corresponding to the APN. At step 320, the GGSN 131 sends an authentication request to the authentication server 160 to authenticate the data service account of the subscriber associated with the device 200. The authentication server 160 authenticates the data service account and replies back to the GGSN 131, at step 322. At step 324, the GGSN 131 requests an IP address from the DHCP server 162. At step 326, the DHCP server 162 returns an IP address to the GGSN 131, At step 328, the GGSN 131 responds to the SGSN 112 with the IP address in a Create PDP Context Response. At step 330, the SGSN 112 replies back to the device 200 with an Activate PDP Context Accept to signal completion of the PDP context activation sequence. At this point, a PDP context 332 has been established between the mobile device 200 and the GGSN 130 configured to serve the assigned APN to facilitate access to the requested service.

Figure 4:
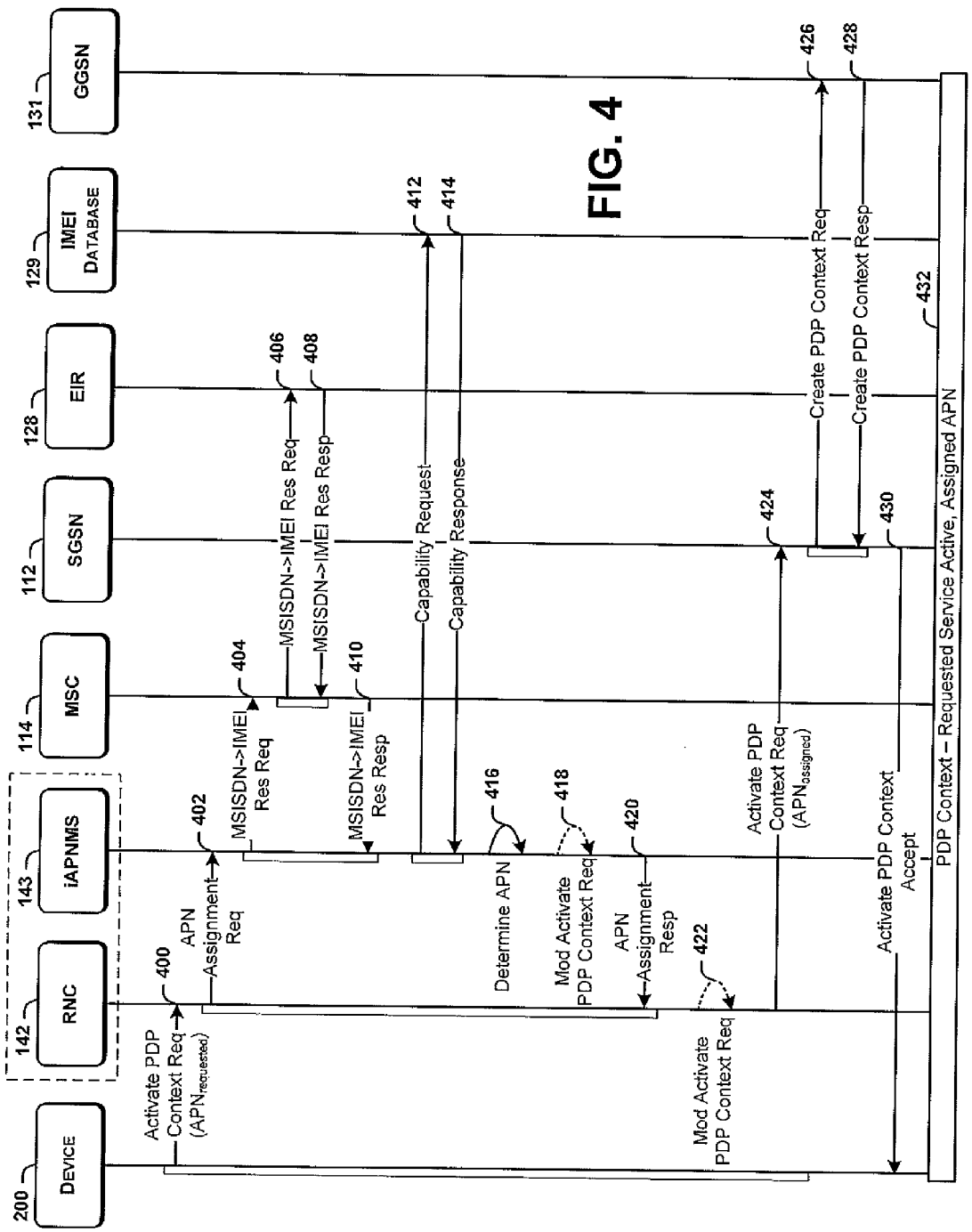
FIG. 4 schematically illustrates an exemplary message flow for intelligent management of APNs, according to another embodiment of the present disclosure.

Referring now to FIG. 4, an exemplary message flow for intelligent management of APNs according to another embodiment of the present disclosure is schematically illustrated. The message flow begins when a service (application) request is received (not shown) at the device 200. This prompts the device 200 to request a PDP context to be activated to access the requested service through a specified APN (e.g., an APN that is configured to serve the requested service). The request is formatted as an Activate PDP Context Request as is typical for a PDP context activation sequence.

At step 400, the Activate PDP Context Request is sent to the RNC 142 with a requested APN ($APN_{requested}$). At step 402, the RNC 142 generates and sends an APN Assignment Request to the iAPNMS 143. The iAPNMS 143, in one embodiment, is configured as a stand-alone network element that is in communication with the RNC 142 to receive the APN Assignment Request and perform the other steps described below with respect to communications between the RNC 142 and the iAPNMS 143. The iAPNMS 143, in another embodiment, is configured as part of the RNC 142. As such, all messages exchanged between the RNC 142 and the iAPNMS 143 are exchanged between a portion of the RNC 142 that provides typical RNC functionality as is known to those skilled in the art and a new portion dedicated to the novel functionality of the iAPNMS 143, as described in more detail herein.

In the illustrated embodiment, the iAPNMS 143 is configured to determine APN assignment based upon a device type of the device 200 and/or a capability of the device 200. The device type and/or capabilities are determined by the IMEI associated with the device. At step 404, the iAPNMS 143 sends a mobile subscriber identity number (MSISDN) to international mobile equipment identity (IMEI) resolution request (MSISDN->IMEI Res Req) to the MSC 114. At step 406, the MSC 114 forward the MSISDN->IMEI Res Req to the EIR 128. The MSISDN->IMEI Res Req includes the MSISDN of the device 200. The EIR 128 resolves the MSISDN received in the MSISDN->IMEI Res Req to the IMEI stored in the EIR 128 in association with that the device's 200 MSISDN. At step 408, the EIR 128 sends a MSISDN->IMEI Res Resp including the device's 200 IMEI to the MSC 114. At step 410, the MSC 114 forwards the MSISDN->IMEI Res Resp to the iAPNMS 143.

At step 412, the iAPNMS 143 sends a Capability Request to the IMEI database 129 to request the capabilities of the device 200 based upon the IMEI received from the EIR 128. The IMEI database 129 performs an IMEI lookup process to retrieve information related to the device 200 including, for example, device type, software version, firmware version, and/or device capabilities. It is contemplated that the Capability Request may request particular types of information such as device capabilities, or any information available from the IMEI database 129 that is associated with the device's 200 IMEI. In any case, the IMEI database 129 responds to the Capability Request, at step 414, with a Capability Response including the requested information.

Alternatively, the MSISDN->IMEI Res Req and Capability Request may be combined and sent as one message to the EIR 128. In this embodiment, the EIR 128 communicates with the IMEI database 129 to retrieve the requested information and returns the requested information to the MSC 114 in a combined MSISDN->MEI Res Resp and Capability Response. In another embodiment, the IMEI database 129 communicates the requested information back to the MSC 114 for forwarding on to the iAPNMS 143 or directly to the iAPNMS 143.

At step 416, the iAPNMS 143 determines an APN to assign to the Activate PDP Context Request based upon device type and/or one or more capabilities of the device 200 as identified by the information received from the IMEI database 129. The iAPNMS 143 is configured to assign shared APNs to low-end device types with low-end capabilities and to assign dedicated APNs to high-end device types with high-end capabilities. By way of example, the iAPNMS 143 is configured to assign shared APNs to devices that are not: capable of multiple simultaneous PDP contexts, configured with a web browser, capable of audio streaming, capable of video streaming, capable of visual voicemail, and/or the like. By way of further example, the iAPNMS 143 is configured to assign dedicated APNs to devices that are: capable of multiple simultaneous PDP contexts, configured with a web browser, capable of audio streaming, capable of video streaming, capable of visual voicemail, and/or the like. The iAPNMS 143 may be configured to assign shared APNs and dedicated APNs based upon any demarcation of low-end and high-end capabilities or on a per capability basis (e.g., the device 200 includes or lacks a certain capability). The iAPNMS 143 may determine APN assignment based upon the capability or lack thereof of the device 200 to perform certain functions due to the device type, hardware components, software components, hardware versions/revisions, software versions/revisions, and the like.

At step 418, the iAPNMS 143 modifies the Activate PDP Context Request by replacing the requested APN with the APN determined by the iAPNMS 143 at step 416. The iAPNMS 143 then responds to the RNC 142, at step 420, with an APN Assignment Response including the modified Activate PDP Context Request. Alternatively, step 418 is omitted and the APN Assignment Response includes the new APN to replace the requested APN. Accordingly, at step 422, the RNC 142 modifies the Activate PDP Context Request by replacing the requested APN with the APN determined by the iAPNMS 143 at step 416 and sent to the RNC 142 at step 420.

Steps 418, 422 are illustrated as optional steps. In one embodiment, the steps 418, 422 are optional in relation to one another. In another embodiment, the steps 418, 422 are not used for the case in which the iAPNMS 143 determines, at step 416, that the requested APN is the appropriate APN for a given scenario and, as such, no modification to the Activate PDP Context Request is required as determined by the iAPNMS 143. It should be noted that the remaining description of FIG. 4 considers the case in which the iAPNMS 143 has determined that a new APN should be assigned.

At step 424, the RNC 142 sends the modified Activate PDP Context Request including the assigned APN to the SGSN 112. At step 426, the SGSN 112 sends a Create PDP Context Request to the GGSN 131. At step 428, the GGSN 131 responds to the SGSN 112 with the IP address in a Create PDP Context Response. At step 430, the SGSN 112 replies back to the device 200 with an Activate PDP Context Accept to signal completion of the PDP context activation sequence. At this point, a PDP context 432 has been established between the mobile device 200 and the GGSN 130 configured to serve the assigned APN to facilitate access to the requested service. Certain steps have been omitted from FIG. 4, including steps similar to those described above with reference to steps 314, 316, 320, 322, 324, 326 in FIG. 3. These steps can likewise be included in FIG. 4.

Referring now to FIG. 5, an exemplary message flow for intelligent management of APNs according to another embodiment of the present disclosure is schematically illustrated. The message flow begins when a service (application) request is received (not shown) at the device 200. This prompts the device 200 to request a PDP context to be activated to access the requested service through a specified APN. The request is formatted as an Activate PDP Context Request as is typical for a PDP context activation sequence.

At step 500, the Activate PDP Context Request is sent to the RNC 142 with a requested APN ($APN_{requested}$) and the IMEI of the device 200. At step 502, the RNC 142 generates and sends an APN Assignment Request to the iAPNMS 143, The iAPNMS 143, in one embodiment, is configured as a stand-alone network element that is in communication with the RNC 142 to receive the APN Assignment Request and perform the other steps described below with respect to communications between the RNC 142 and the iAPNMS 143. The iAPNMS 143, in another embodiment, is configured as part of the RNC 142. As such, all messages exchanged between the RNC 142 and the iAPNMS 143 are exchanged between a portion of the RNC 142 that provides typical RNC functionality as is known to those skilled in the art and a new portion dedicated to the novel functionality of the iAPNMS 143, as described in more detail herein.

In the illustrated embodiment, the iAPNMS 143 is configured to determine APN assignment based upon a device type of the device 200 and/or a capability of the device 200. The device type and/or capabilities are determined by the IMEI associated with the device. At step 504, the iAPNMS 143 sends a Capability Request to the IMEI database 129 to request the capabilities of the device 200 based upon the IMEI received in the Activate PDP Context Request. In an alternative embodiment, the iAPNMS 143 sends the Capability Request to the MSC 114 which forwards the Capability Request to the IMEI database 129. In any case, the IMEI database 129 performs an IMEI lookup process to retrieve information related to the device 200 including, for example, device type, software version, firmware version, and/or device capabilities. It is contemplated that the Capability Request may request particular types of information such as device capabilities, or any information available from the IMEI database 129 that is associated with the device's 200 IMEI. In any case, the IMEI database 129 responds to the Capability Request, at step 506, with a Capability Response including the requested information.

At step 508, the iAPNMS 143 determines an APN to assign to the Activate PDP Context Request based upon device type and/or one or more capabilities of the device 200 as identified by the information received from the IMEI database 129. The iAPNMS 143 is configured to assign shared APNs to low-end device types with low-end capabilities and to assign dedicated APNs to high-end device types with high-end capabilities. By way of example, the iAPNMS 143 is configured to assign shared APNs to devices that are not: capable of multiple simultaneous PDP contexts, configured with a web browser, capable of audio streaming, capable of video streaming, capable of visual voicemail, and/or the like. By way of further example, the iAPNMS 143 is configured to assign dedicated APNs to devices that are: capable of multiple simultaneous PDP contexts, configured with a web browser, capable of audio streaming, capable of video streaming, capable of visual voicemail, and/or the like. The iAPNMS 143 may be configured to assign shared APNs and dedicated APNs based upon any demarcation of low-end and high-end capabilities or on a per capability basis (e.g., the device 200 includes or lacks a certain capability). The iAPNMS 143 may determine APN assignment based upon the capability or lack thereof of the device 200 to perform certain functions due to the device type, hardware components, software components, hardware versions/revisions, software versions/revisions, and the like.

At step 510, the iAPNMS 143 modifies the Activate PDP Context Request by replacing the requested APN with the APN determined by the iAPNMS 143 at step 508. The iAPNMS 143 then responds to the RNC 142, at step 512, with an APN Assignment Response including the modified Activate PDP Context Request. Alternatively, step 510 is omitted and the APN Assignment Response includes the new APN to replace the requested APN. Accordingly, at step 514, the RNC 142 modifies the Activate PDP Context Request by replacing the requested APN with the APN determined by the iAPNMS 143 at step 508 and sent to the RNC 142 at step 512.

Steps 510, 514 are illustrated as optional steps. In one embodiment, the steps 510, 514 are optional in relation to one another. In another embodiment, the steps 510, 514 are not used for the case in which the iAPNMS 143 determines, at step 508, that the requested APN is the appropriate APN for a given scenario and, as such, no modification to the Activate PDP Context Request is required as determined by the iAPNMS 143. It should be noted that the remaining description of FIG. 5 considers the case in which the iAPNMS 143 has determined that a new APN should be assigned.

At step 516, the RNC 142 sends the modified Activate PDP Context Request including the assigned APN to the SGSN 112. At step 518, the SGSN 112 sends a Create PDP Context Request to the GGSN 131. At step 520, the GGSN 131 responds to the SGSN 112 with the IP address in a Create PDP Context Response. At step 522, the SGSN 112 replies back to the device 200 with an Activate PDP Context Accept to signal completion of the PDP context activation sequence. At this point, a PDP context 524 has been established between the mobile device 200 and the assigned APN to facilitate access to the requested service. Certain steps have been omitted from FIG. 5, including steps similar to those described above with reference to steps 314, 316, 320, 322, 324, 326 in FIG. 3. These steps can likewise be included in FIG. 5.

In some embodiments, the iAPNMS 143 is further configured to send a message via the RNC 142 identifying the assigned APN so that the device 200 is able to use the assigned APN instead of the requested APN in making future requests for the same service. The iAPNMS 143 may, however, determine to change a previously assigned APN to yet another APN upon analysis of the relevant variables used in making a particular APN assignment determination.

In some embodiments, the iAPNMS 143 is configured to monitor network conditions including available network resources, PDP contexts, and connections to particular APNs. The iAPNMS 143 may be configured to monitor these conditions until a threshold value is reached or exceeded. In response, the iAPNMS 143 may send a message via the RNC 142 requesting the APN to be changed, for example, from a dedicated APN to a shared APN. The RNC 142 may then communicate with the SGSN 112 which may, in turn, communicate with the GGSN 131 with a new Create PDP Context Request with the newly assigned APN.

The iAPNMS 143 may assign shared and dedicated APNs solely or further based upon various other factors including, but not limited to, a current time, a current device location, a serving network location, associated network load at the serving network location (e.g., SGSN, GGSN, RNC, BSC, MSC, BTS, node-B loads), requested application/service type (e.g., real-time or delay-sensitive application vs. non-real-time or non-delay-sensitive application), user preferences (e.g., user-defined priorities for services/applications).

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
generating, by a processor, a mobile-subscriber-integrated-services- digital-network-number-to-international-mobile-equipment-identity resolution request;
sending, by the processor, the resolution request to an equipment identity register to resolve an international mobile equipment identity associated with a device;
receiving, by the processor, from the equipment identity register in response to the resolution request, the international mobile equipment identity associated with the device;
generating, by the processor, a capability request;
sending, by the processor, the capability request to an international mobile equipment identity database;
receiving, by the processor, from the international mobile equipment identity database in response to the capability request, a capability of the device;
determining, by the processor, based upon an assignment factor comprising the capability of the device, an access point name to assign to a packet data protocol context activation request, yielding a determined access point name;
assigning, by the processor, the determined access point name to the packet data protocol context activation request; and
modifying, by the processor, the packet data protocol context activation request to comprise the determined access point name.

2. The method of claim 1, wherein determining, based upon the assignment factor, the access point name to assign to the packet data protocol context activation request comprises determining the access point name to assign to the packet data protocol context activation request based upon at least one variable selected from a group of variables consisting of (I) a requested service identified by a service identification included in the packet data protocol context activation request, (II) a device type of the device, (III) the capability of the device, (IV) a current network status, (V) a predicted, further network status, (VI) a network load, (VII) a network element load, (VIII) a number of devices currently connected to a requested access point name requested in the packet data protocol context activation request, (IX) a number of devices currently receiving a service requested by the packet data protocol context activation request, and (X) a load balancing scheme.

3. A computer-readable storage device comprising computer-executable instructions that, when executed by a processor, cause the processor to perform operations comprising:
generating a mobile-subscriber-integrated-services-digital-network- number-to-international-mobile-equipment-identity resolution request;
sending the resolution request to an equipment identity to resolve an international mobile equipment identity associated with a device;
receiving, in response to the resolution request, the international mobile equipment identity associated with the device from the equipment identity register;
generating a capability request;
sending the capability request to an international mobile equipment identity database; receiving, in response to the capability request, a capability of the device from the international mobile equipment identity database;
determining, based upon an assignment factor comprising the capability . . . of the device, an access point name to assign to the packet data protocol context activation request, yielding a determined access point name;
assigning the determined access point name to the packet data protocol context activation request; and
modifying the packet data protocol context activation request to comprise the determined access point name.

4. The computer-readable storage device of claim 3, wherein determining, based upon the assignment factor, the access point name to assign to the packet data protocol context activation request comprises determining the access point name to assign to the packet data protocol context activation request based upon at least one of (I) a requested service identified by a service identification included in the packet data protocol context activation request, (II) a device type of the device, (III) the capability of the device, (IV) a current network status, (V) a predicted, future network status, (VI) a network load, (VII) a network element load, (VIII) a number of devices currently connected to a requested access point name requested in the packet data protocol context activation request, (IX) a number of devices currently received a service requested by the packet data protocol context activation request, and (X) a load balancing scheme.

5. A system comprising: a processor; and a computer-readable storage device being in operative communication with the processor and having stored thereon computer-executable instructions that, when executed by the processor, cause the processor to perform operations comprising:
generating a mobile-subscriber-integrated-services-digital-network- number-to-international-mobile-equipment-identity resolution request;
sending the resolution request to an equipment identity register to resolve an associated with a device;
receiving, from the equipment identify register in response to the resolution request, the international mobile equipment identity associated with the device;
generating a capability request;
sending the capability request to an international mobile equipment identity database;

receiving, in response to the capability request, a capability of the device from the international mobile equipment identity database;

determining, based upon an assignment factor comprising the capability of the device, an access point name to assign to a packet data protocol context activation request, yielding a determined access point name;

assigning the determined access point name to the packet data protocol context activation request; and modifying the packet data protocol context activation request to comprise the determined access point name.

6. The system of claim 5, wherein the compute executable instructions, when executed by the processor, cause the processor to perform the operations further comprising receiving the packet data protocol context activation request from the device; generating an access point name assignment request; and sending the access point name assignment request.

7. The system of claim 5, wherein:
the computer-readable storage device is a first computer-readable storage device having the computer-executable instructions being first computer-executable instructions for execution by the processor being a first processor; and the system further comprises a second computer-readable storage device having stored thereon second computer-executable instructions that, when executed by a second processor, cause the second processor to perform operations comprising:

receiving the packet data protocol context activation request from the device;

generating an access point name assignment request; and sending the access point name assignment request to the first processor.

8. The system of claim 5, wherein determining the access point name to assign to the packet data protocol context activation request comprises determining the access point name to assign to the packet data protocol context activation request based upon at least one variable selected from a group of variables consisting of (I) a requested service identified by a service identification included in the packet data protocol context activation request, (II) a device type of the device, (III) the capability of the device, (IV) a current network status, (V) a predicted, future network status, (VI) a network load, (VII) a network element load, (VIII) a number of devices currently connected to a requested access point name requested in the packet data protocol context activation request, (IX) a number of devices currently receiving a service requested by the packet data protocol context activation request, and (X) a load balancing scheme.

* * * * *